(12) United States Patent
Fitzgibbons

(10) Patent No.: US 7,577,508 B2
(45) Date of Patent: Aug. 18, 2009

(54) MOBILITY TRACTION CONTROL SYSTEM AND METHOD

(75) Inventor: Patrick J. Fitzgibbons, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/798,018

(22) Filed: May 9, 2007

(65) Prior Publication Data

US 2007/0265749 A1 Nov. 15, 2007

Related U.S. Application Data

(63) Continuation-in-part of application No. 11/430,771, filed on May 9, 2006, now abandoned.

(60) Provisional application No. 60/798,713, filed on May 9, 2006.

(51) Int. Cl.
*G06F 7/70* (2006.01)
(52) U.S. Cl. .......................................... 701/70; 701/82
(58) Field of Classification Search .................. 701/1, 701/32, 33, 36, 37, 41, 42, 70–74, 80–83, 701/90; 180/197; 303/139–150
See application file for complete search history.

(56) References Cited

U.S. PATENT DOCUMENTS

| | | | |
|---|---|---|---|
| 4,072,850 A | 2/1978 | McGlynn | |
| 4,593,357 A | 6/1986 | Van Ostrand et al. | |
| 4,621,833 A | 11/1986 | Soltis | |
| 4,691,284 A | 9/1987 | Izumi et al. | |
| 4,843,557 A | 6/1989 | Ina et al. | |
| 4,882,693 A | 11/1989 | Yopp | |
| 4,922,427 A | 5/1990 | Yokote et al. | |
| 4,954,957 A | 9/1990 | Kawagoe et al. | |
| 5,037,119 A | 8/1991 | Takehara et al. | |
| 5,044,660 A | 9/1991 | Yamamura et al. | |
| 5,091,856 A | 2/1992 | Hasegawa et al. | |
| 5,123,497 A | 6/1992 | Yopp et al. | |
| 5,136,513 A | 8/1992 | Sol et al. | |
| 5,161,106 A | 11/1992 | Shiraishi et al. | |
| 5,183,127 A | 2/1993 | Kageyama et al. | |
| 5,255,193 A | 10/1993 | Katayose et al. | |
| 5,265,945 A | 11/1993 | Yamashita et al. | |

(Continued)

FOREIGN PATENT DOCUMENTS

EP    1028011 A2    8/2000

(Continued)

OTHER PUBLICATIONS

Proceedings of the IEEE, vol. 88, No. 7, Jul. 2000, "Automotive Engine Control and Hybrid Systems: Challenges and Opportunities", pp. 888-912.

(Continued)

*Primary Examiner*—Richard M. Camby
(74) *Attorney, Agent, or Firm*—Miles & Stockbridge PC; James T. Carmichael

(57) ABSTRACT

A system and method for vehicle mobility traction/ride control. The system includes a mode controller configured to output control signals to a variety of vehicle control subsystems in response to operator mode selection input.

15 Claims, 8 Drawing Sheets

U.S. PATENT DOCUMENTS

| | | | |
|---|---|---|---|
| 5,281,008 A | 1/1994 | Kawamura et al. |
| 5,366,041 A | 11/1994 | Shiraishi |
| 5,369,584 A | 11/1994 | Kajiwara |
| 5,400,265 A | 3/1995 | Kauppinen |
| 5,401,052 A | 3/1995 | Yoshioka et al. |
| 5,408,411 A | 4/1995 | Nakamura et al. |
| 5,469,356 A | 11/1995 | Hawkins et al. |
| 5,487,002 A | 1/1996 | Diller et al. |
| 5,513,107 A | 4/1996 | Gormley |
| 5,564,796 A | 10/1996 | Saito et al. |
| 5,632,503 A | 5/1997 | Raad et al. |
| 5,636,909 A | 6/1997 | Hirao et al. |
| 5,906,560 A | 5/1999 | Minowa et al. |
| 5,906,645 A | 5/1999 | Kagawa et al. |
| 5,941,919 A | 8/1999 | Pastor et al. |
| 5,971,089 A | 10/1999 | Sawada |
| 6,018,308 A | 1/2000 | Shirai |
| 6,038,500 A | 3/2000 | Weiss |
| 6,074,020 A | 6/2000 | Takahashi et al. |
| 6,122,572 A | 9/2000 | Yavnai |
| 6,154,688 A | 11/2000 | Dominke et al. |
| 6,188,945 B1 | 2/2001 | Graf et al. |
| 6,199,003 B1 | 3/2001 | Hollingsworth et al. |
| 6,205,374 B1 | 3/2001 | Kljima et al. |
| 6,216,068 B1 | 4/2001 | Gimmler et al. |
| 6,226,581 B1 | 5/2001 | Reimann et al. |
| 6,240,347 B1 | 5/2001 | Everhart et al. |
| 6,249,727 B1 | 6/2001 | Muller |
| 6,260,859 B1 | 7/2001 | Dixon |
| 6,278,929 B1 | 8/2001 | Tozu et al. |
| 6,381,524 B1 | 4/2002 | Kuragaki et al. |
| 6,424,900 B2 | 7/2002 | Murray et al. |
| 6,738,701 B2 | 5/2004 | Wilson |
| 6,816,764 B2 | 11/2004 | Coelingh et al. |
| 6,856,877 B2 | 2/2005 | Coelingh et al. |
| 6,873,891 B2 | 3/2005 | Moser et al. |
| 6,879,898 B2 | 4/2005 | Ghoneim et al. |
| 6,904,351 B1 * | 6/2005 | Hac .................... 701/70 |
| 7,162,333 B2 * | 1/2007 | Koibuchi et al. .......... 701/1 |
| 2001/0003805 A1 | 6/2001 | Koibuchi |
| 2002/0016659 A1 | 2/2002 | Tashiro et al. |
| 2002/0099484 A1 | 7/2002 | Kuragaki et al. |
| 2003/0200016 A1 | 10/2003 | Spillane et al. |
| 2004/0044443 A1 | 3/2004 | Eriksson |
| 2004/0044448 A1 | 3/2004 | Ramasamy et al. |
| 2004/0193352 A1 | 9/2004 | Ito et al. |
| 2004/0193363 A1 | 9/2004 | Schmidt et al. |
| 2004/0249533 A1 | 12/2004 | Wheals et al. |
| 2005/0004732 A1 | 1/2005 | Berry et al. |
| 2005/0080528 A1 | 4/2005 | Obradovich |
| 2005/0080546 A1 | 4/2005 | Milot |
| 2005/0096799 A1 | 5/2005 | Boswell et al. |
| 2005/0114007 A1 | 5/2005 | Pillar et al. |
| 2005/0149243 A1 | 7/2005 | Chow |
| 2005/0177287 A1 | 8/2005 | Wang et al. |
| 2005/0203684 A1 | 9/2005 | Borgesson |
| 2005/0206234 A1 | 9/2005 | Tseng et al. |
| 2006/0076828 A1 | 4/2006 | Lu et al. |

FOREIGN PATENT DOCUMENTS

| | | |
|---|---|---|
| EP | 1 355 209 A1 | 10/2003 |
| FR | 2796 893 | 2/2001 |
| GB | 2357159 A | 6/2001 |
| JP | 04238745 | 8/1992 |
| JP | 06219187 | 8/1994 |
| JP | 06219191 | 8/1994 |
| WO | WO 95/31638 | 11/1995 |
| WO | WO 01/54940 A1 | 8/2001 |

OTHER PUBLICATIONS

Integrated Manufacturing Systems, vol. 5 No. 4/5, 1994, pp. 5-12 "An Exploration of Concepts in Systems Integration".

Industrial Robot, vol. 4, No. 5, 1997, pp. 364-369, "Automating Agricultural Vehicles".

Electronic Times, Mar. 26, 2001, "ECUs Used to Win Control".

"Overlay Wiring Architecture and EDS Challenges in Hybrid Electric Vehicle Prototypes", Ford Motor Company, Dr. Arun K. Jaura et al., pp. 1-12.

JSAE Review 22 (2001), pp. 453-461, "coordinated Control of a Mechanical Hybrid Driveline with a Continuously Variable Trnasmission", Shiwen Shen et al.

International Search Report and Written Opinion of the International Searching Authority dated May 29, 2008, International Application No. PCT/US 07/11203 filed May 9, 2007.

Electronics Times, Mar. 26, 2001, "ECUs Used to Win Control".

* cited by examiner

|  | Differentials | | | ABS | Stab | Ride | Tire Pressure (psi) based on Axle load | | |
|---|---|---|---|---|---|---|---|---|---|
| Setting/Button | Front | Center | Rear | Mod | Control | Height | L-6,000 | M-9,000 | H-12,000 |
| a. On-road | Open | Open | Open | 1 | 1 | 11" | 26.5 | 44.6 | 62.6 |
| b. Hard packed snow and ice | Open | Open | Open | 1 | 1 | 11" | ? | ? | ? |
| c. Moderate off-road and snow | Open | Locked | Locked | 2 | 0 | 15" | 19.9 | 38 | 56 |
| d. Deep Mud (Deep Snow?) | Locked | Locked | Locked | 2 | 0 | 15" | 8.3 | 16.7 | 25 |
| e. Deep Sand | Open | Locked | Open | 2 | 0 | 15" | 8.3 | 16.7 | 25 |
| f. Emergency/Emergency Reset (Dual Function) used with D or E | | | | | | | 8.3 | 14.3 | 21.5 |
| g. Tow (being towed) | Open | Neutral | Open | | | | | | |

Used in conjunction with above buttons (i.e. two active when being towed). However, this button will override the differential control associated with the above buttons.

*Fig. 5*

MOBILITY TRACTION CONTROL SYSTEM AND METHOD

The present application claims the benefit of U.S. Provisional Application No. 60/798,713, entitled "Mobility Traction Control System and Method," filed May 9, 2006, and is a continuation-in-part of U.S. patent application Ser. No. 11/430,771, filed May 9, 2006, now abandoned which are hereby incorporated by reference.

The present invention relates generally to vehicle control, and, more particularly, to systems and methods for vehicle traction control.

BRIEF DESCRIPTION OF THE DRAWINGS

FIG. 5 is a diagram showing a mode control table for outputting control information to vehicle subsystems associated with various mobility modes according to various embodiments;

DETAILED DESCRIPTION

Embodiments are directed generally to a system and method for vehicle ride and/or traction control. In particular, various embodiments can comprise a mode controller configured to output control signals to a variety of vehicle subsystems in response to operator mode selection inputs.

Figure 1:
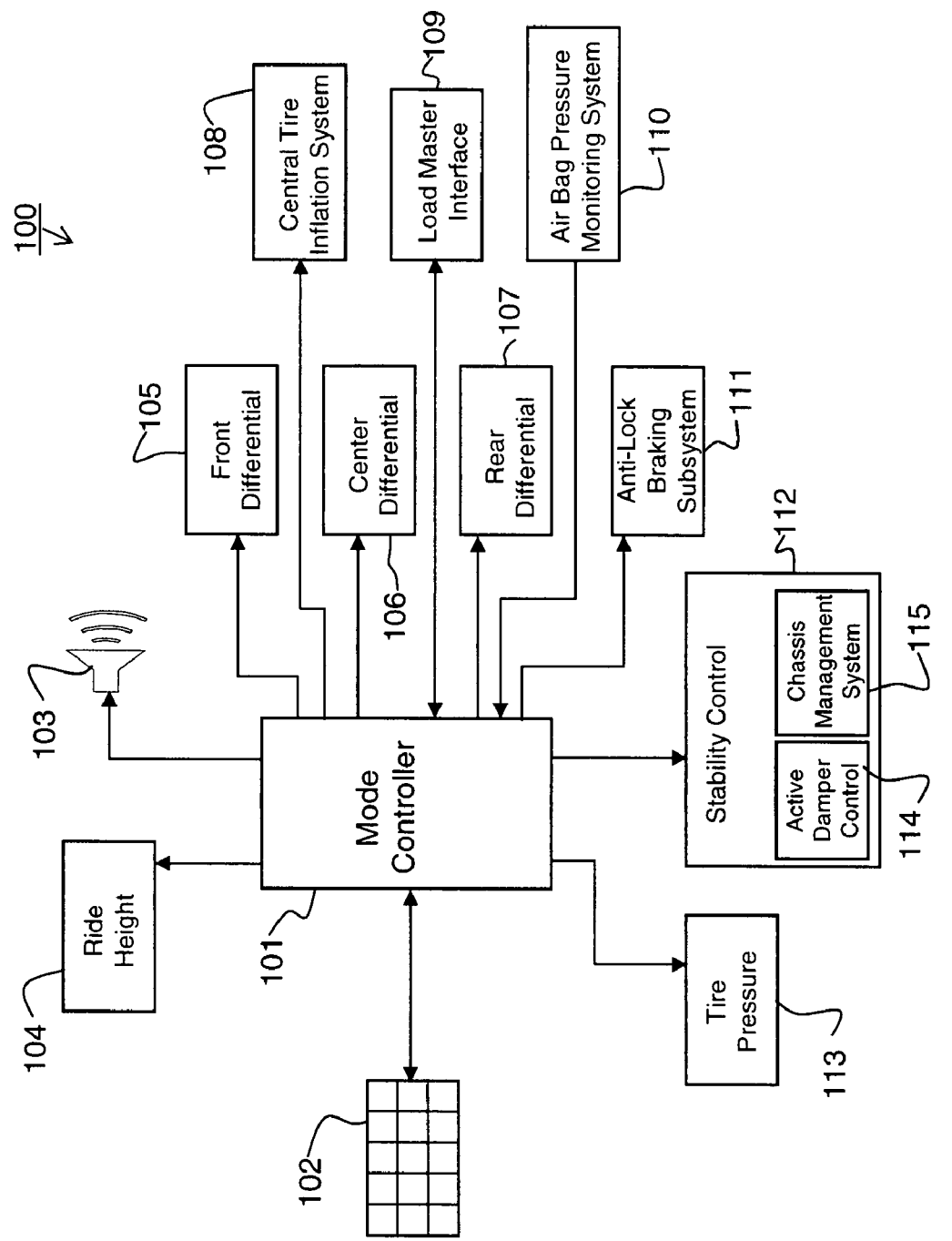
FIG. 1 is a system block diagram of a traction control system according to various embodiments.

With respect to FIG. 1, there is shown a mobility traction control system 100 according to various embodiments. Mobility traction control system 100 can be implemented in any suitable mobile vehicle (vehicle not shown). As shown in FIG. 1, various embodiments mobility traction control system 100 may comprise a mode controller 101, at least one input apparatus 102, a communication apparatus 103, a load master interface 109, and a plurality of vehicle subsystems, which can include, for example, a ride height subsystem 104; a differential subsystem, including, for example, differentials 105, 106, and 107; a central tire inflation subsystem (CTIS) 108; an air bag pressure monitoring subsystem 110; an anti-lock braking subsystem (ABS) 111; a stability control subsystem 112; and a tire pressure subsystem 113. In various embodiments, ride height subsystem 104, differential subsystem (105, 106, and 107), central tire inflation subsystem (CTIS) 108, air bag pressure monitoring subsystem 110, anti-lock braking subsystem (ABS) 111, stability control subsystem 112 (which may include an active damper control subsystem 114 and a chassis management system 115), and tire pressure subsystem 113 can be conventional over-the-counter subsystems (COTS). In various embodiments, each of the differentials 105-107 may be a controllable differential having at least two states of operation: a locked state in which the differential transmits drive force to both of its wheels regardless of rotation resistance, and an open state in which the differential transmits drive force to the wheel experiencing the least rotation resistance. In various embodiments, a third state of operation can be provided in which the differential does not transmit drive force to its wheels (for example, free-wheeling or disengaged). In addition to the subsystems shown in FIG. 1, ride control system 100 can include any suitable ride control subsystems. In various embodiments, the load master interface 109 can comprise a physical input/output device (such as, for example, a keyboard and display) accessible to a human load master, an electronic or optical communication interface operably couples to an automata or computer-implemented load master, or a combination thereof.

In various embodiments, mode controller 101 can be coupled to input apparatus 102, communication apparatus 103, load master interface 109, and the vehicle subsystems, including vehicle subsystems not explicitly shown in FIG. 1. Mode controller 101 can be any suitable controller. In various embodiments, mode controller 101 can comprise mode control logic including a plurality of programmable hardware components. Alternatively, mode controller 101 can comprise a processor such as, but not limited to, a microprocessor, microcontroller, or microcomputer. The mode controller 101 can execute a sequence of programmed instructions. The instructions can be compiled from source code instructions provided in accordance with a programming language such as C++. The instructions can also comprise code and data objects provided in accordance with, for example, the Visual Basic™ language, or another object-oriented programming language. In various embodiments, mode controller 101 may comprise an Application Specific Integrated Circuit (ASIC) including hard-wired circuitry designed to perform traction and/or ride control operations described herein.

In various embodiments, mode controller 101 may communicate with input apparatus 102, communication apparatus 103, load master interface 109, and the vehicle subsystems in any suitable manner. Communication can be facilitated by, for example, a vehicle data/command serial bus. In various embodiments, the interface can comprise, for example, a parallel data/command bus, or may include one or more discrete inputs and outputs. As one example, mode controller 101 can communicate with input apparatus 102 and/or the vehicle subsystems 104-115 using a J1939 bus. As another example, in various embodiments, mode controller 101 may receive status information from load master interface 109 and air bag pressure monitoring system 110. In various embodiments, operator mode and/or setting selection input information from, for example, keypad 202, in the form of one or more digital status words in which various bit fields of each status word contain status information for a particular device or subsystem.

In various embodiments, mode controller 101 can be configured to receive any suitable inputs from input apparatus 102, load master interface 109, and air bag pressure monitoring system 110, as well as to send outputs, such as audio or visual information to communication apparatus 103 and visual information to input apparatus 102. Outputs sent from ride controller 101 to input apparatus 102 can be any suitable outputs such as, for example, data, mode information, subsystem status information, or warning information. Mode controller 101 can also output any suitable data or control signal to load master interface 109.

Other subsystem interfaces are possible. Although this embodiment describes discrete vehicle ride and traction modes and/or settings, it may also be possible in another embodiment for the user or the controller to control various settings individually. In another embodiment, it may also be possible to change system settings, such as tire pressure, continuously.

In various embodiments, mode controller 101 may output control signals to one or more vehicle subsystems 104-115. For example, mode controller 101 may output control signals to ride height adjustment system 104, differentials 105-107, Central Tire Inflation System (CTIS) 108, load master interface 109, anti-lock braking subsystem 111, and stability control subsystem 112, including active damper control 113 and chassis management system 114. In various embodiments, other or additional vehicle control subsystems may be implemented, including, but not limited to, a differential control subsystem, a rollover control subsystem, a propulsion control subsystem, an active steering subsystem, a transmission control subsystem, a slope control subsystem, and a descent control subsystem, etc. In various embodiments, mode controller 101 can output control signals to subsystems 104-115 in the form of one or more digital control words in which the contents of the various bit fields of each control word contain command parameter information that is received and interpreted by a particular device or subsystem as a command or mode selection parameter or setting for the subsystem. In various embodiments, mode controller 101 can output control signals to one or more of subsystems 104-115 to set the subsystems to a particular state in response to receiving an operator input for a particular mobility traction control mode and/or setting via input apparatus 102.

In various other embodiments, mode controller 101 may collect data from sensors (not shown) associated with one or more of the vehicle subsystems. The received data may be used to modify or optimize selected traction and/or ride modes or settings. The data may also be used to automatically shift traction and/or ride modes or settings when desirable. As an example, in at least one embodiment, a user may select, using input apparatus 102, an "off-road" mode of operation. After an initial off-road mode setting mode controller 101 may receive data from one or more sensor indicating, for example, rotational tire slip, and therefore decrease tire pressure or decrease suspension damping to improve vehicle subsystems' performances in the selected mode.

Furthermore, in various embodiments, mode controller 101 can comprise an interface to a trailer (not shown) towed by the vehicle, including monitoring and control of trailer ride height, axle weight and tire pressures based on trailer axle loads. In various embodiments, a three-dimensional center of gravity and axle weight of the trailer is calculated.

As discussed above, in various embodiments, communication apparatus 103 can be coupled to mode controller 101, and can be used to communicate information and/or data to a user. In various embodiments, communication apparatus 103 can be any suitable communication apparatus, including, but not limited to, an audio apparatus, such as a speaker, or a visual apparatus, such as a heads-up display, a touch screen display, light emitting diodes, etc. In various embodiments, communication apparatus 103 can be a combination of more than one audio and/or visual communication apparatuses. In FIG. 1, for example, the communication apparatus 103 is shown as an audio speaker.

Still referring to FIG. 1, in various embodiments, input apparatus 102 can be coupled to mode controller 101, and can send and receive data and information to and from mode controller 101. In various embodiments, input apparatus 102 can receive an input from any suitable means, including, but not limited to, a user's "physical" input, an input transmitted from a source remote input apparatus 102, such as by a wireless communication device or an audible command from the user. Input apparatus 102 can be located at any suitable position in the vehicle, for example, on the vehicle interior dashboard. According to various embodiments, input apparatus 102 can be used to select and deselect vehicle ride traction and/or modes or settings. Input apparatus 102 may be configured as any suitable input apparatus, including, but not limited to, a keypad or a plurality of keypads. In various embodiments, the keypad can receive user input by any suitable means. For example, keypad may use buttons, switches, levers, knobs, an interactive Liquid Crystal Display (LCD), etc. as a means to receive a user's input.

Figure 2:
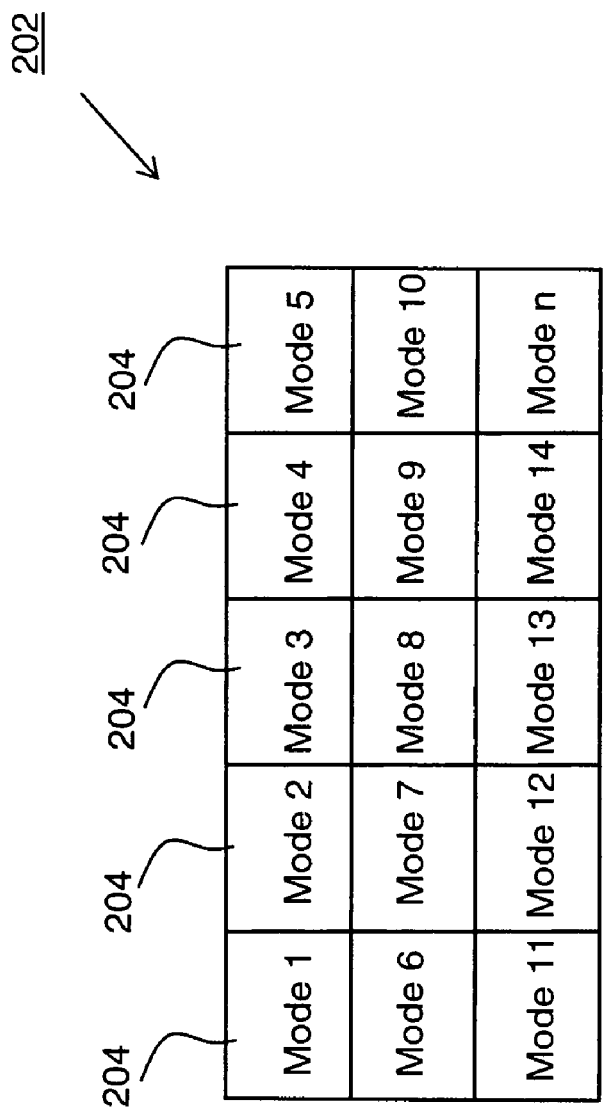
FIG. 2 is a general illustration of an input apparatus according to various embodiments.

In various embodiments, the input apparatus 102 can comprise one or more keypads 202. FIG. 2 is a general illustration of a keypad 202 according to various embodiments. As shown in FIG. 2, keypad 202 can include a plurality of selectable entries. In various embodiments, the entries may be representative of, for example, user-selectable traction and/or riding modes or settings. For example, in FIG. 2, keypad 202 may include "n" number of mode selections, where "n" is a number greater than or equal to one. In the example shown in FIG. 2, a user may select a particular vehicle traction and/or ride mode or setting via the corresponding user-controllable input means 204 on keypad 202. User-controllable input means 204 may be configured as, but not limited to, buttons, switches, levers, knobs, an interactive Liquid Crystal Display (LCD), etc. The keypad 202 shown in FIG. 2, for example, has fifteen user-controllable input means 204, however, any suitable number of user-controllable input means 204 may be implemented. In various embodiments, keypad 202 can send data and/or information to mode controller 101 based on the selected mode (or setting).

Figure 3:
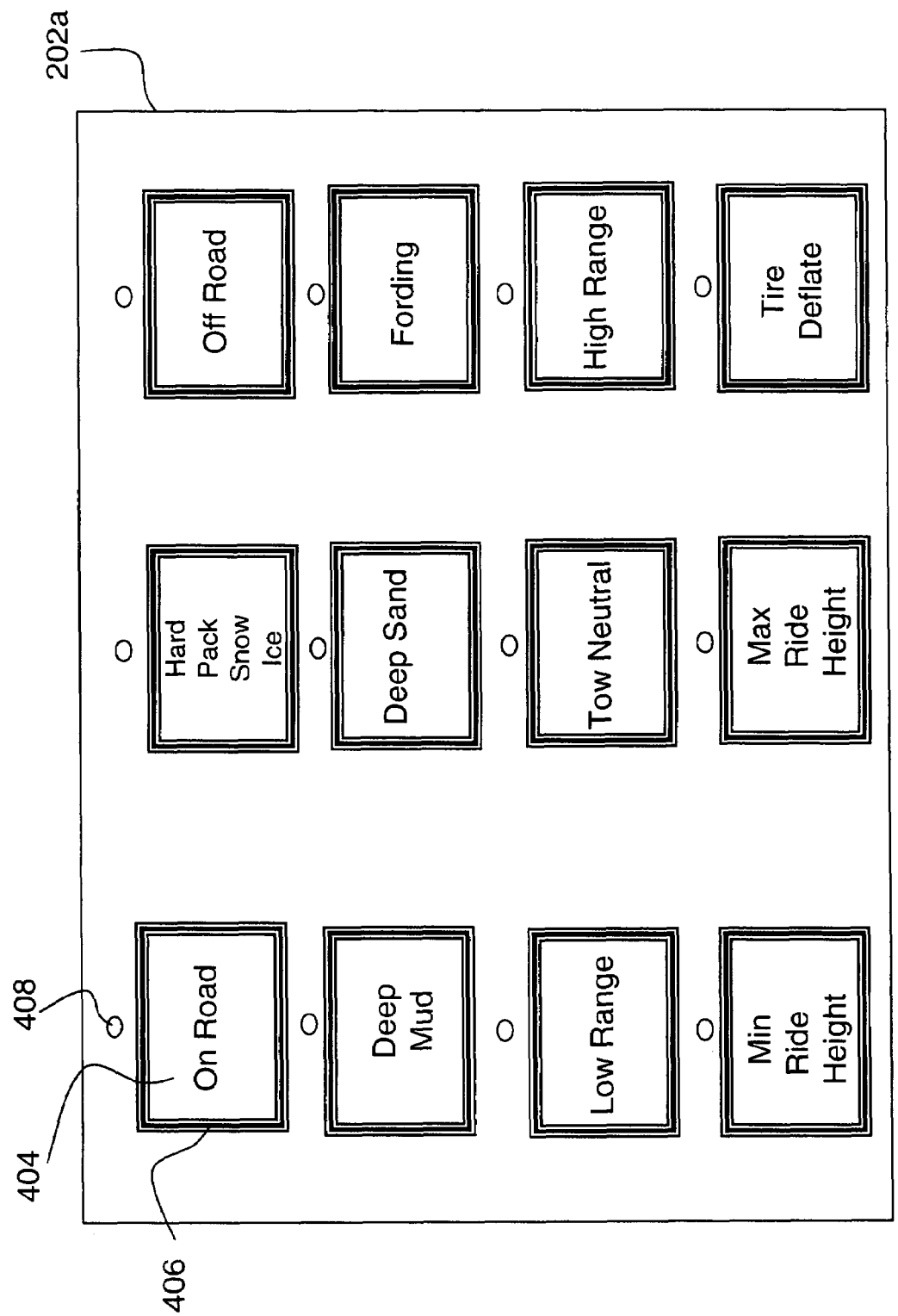
FIG. 3 is an illustration of an input apparatus according to various embodiments.
Figure 4:
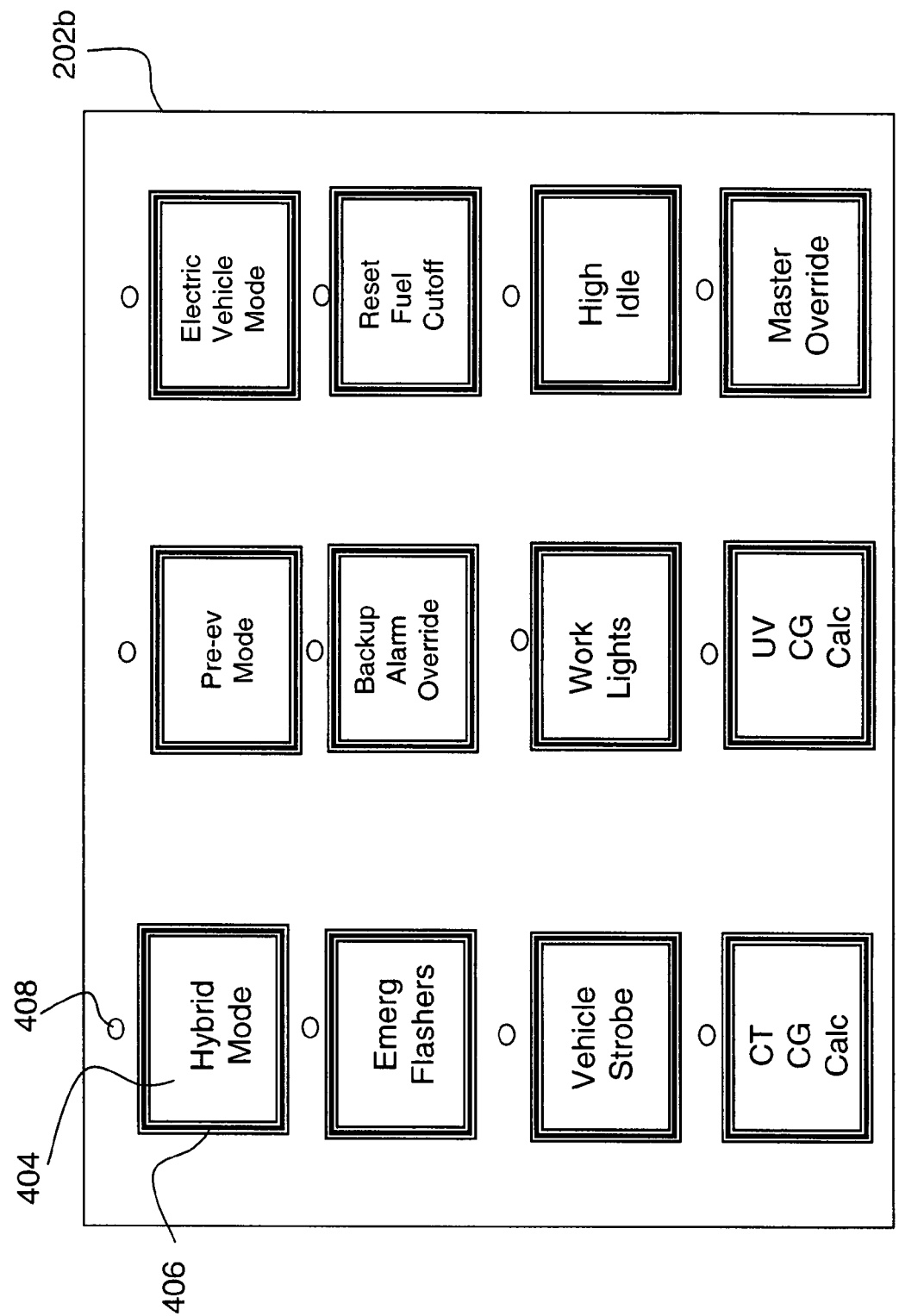
FIG. 4 is another illustration of an input apparatus according to various embodiments.

FIGS. 3 and 4 show keypads 202a and 202b, respectively, according to various embodiments. In various embodiments, keypad 202 can include one or more keypads, such as keypads 202a and 202b, each of which can include one or more user-controllable input means 204, and associated indicia, corresponding to a plurality of user-selectable (and de-selectable) vehicle ride modes, settings, and/or command identifiers. In various embodiments, keypad 202 can include any suitable mode selection identifier, such as, but not limited to, a hybrid mode, a pre-ev mode, an electric vehicle mode, an on-road mode, a hard pack snow ice mode, an off road mode, a deep mud mode, a deep sand mode, a fording mode. In addition, keypad 202 according to various embodiments can include any suitable setting or command identifier, such as, but not limited to, an emergency flashers setting, a backup alarm override, a reset fuel cutoff, a vehicle strobe, a work light setting, a high idle setting, a center of gravity and axle weight calculation command, a trailer center of gravity and axle weight calculation command, a master override command, a low range setting, a tow neutral setting, a high range setting, a minimum ride height setting, a maximum ride height setting, and a tire deflate command. In various embodiments, keypad 202 can also provide a positive indication such as, for example, a light or illumination of a button 404 or reverse background for the button 406, to indicate that a particular mode setting is active. In various embodiments, button 404 for a particular mode or setting can flash to indicate a change to the new mode or setting. For example, button 404 can flash red to indicate if the vehicle state (e.g., speed) prevents a mode change from occurring. In various embodiments, keypad 202 can include an indicator 408. Indicator 408 can be any suitable indicator, such as, but not limited to, a light or light emitting diode, corresponding to each button 404. Indicators 408 can indicate a selection of a corresponding button 404, that a particular mode setting is active, or an error condition for a selected mode.

FIG. 5 shows a mode control diagram table for mode controller 101. According to FIG. 5 mode controller 101 may be configured to output control information to various vehicle subsystems corresponding to one of a plurality of modes. As discussed above, in various embodiments, mode controller 101 can output control information for modes including, but not limited to, an on-road mode 501, a hard packed snow and ice mode 502, a moderate off-road and snow mode 503, a deep mud mode 504, a deep sand mode 505, an emergency/emergency reset mode 506, and a tow mode 507. Other modes are possible. As shown in FIG. 5, for each of the modes 501-507, mode controller 101 can output control information to predetermined vehicle subsystems to cause the vehicle control subsystems to operate in states that cooperatively result in desired traction and/or ride control for the corresponding mode 501-507.

For example, upon receiving an operator input via keypad 202a indicating operator selection of on-road mode 501, mode controller 101 may output control signals and/or information to cause the front differential to operate in the open state, the center differential to operate in the open state, the rear differential to operate in the open state, the anti-lock braking subsystem 111 to operate in a predetermined mode (designated as mode 1), the stability control subsystem 112 to operate in a predetermined mode (designated as mode 1), the ride height subsystem 104 to be set to a predetermined height, and the tire pressure, via the CTIS 108, to be set to a predetermined pressure corresponding to a load associated with a vehicle load, for example, but not limited to, 26.5 psi, 44.6 psi, and 62.6 psi for light (e.g., 6,000 lbs.), medium (e.g., 9,000 0lbs.), and heavy (e.g., 12,000 lbs.) loads, respectively. For other modes 502-507, mode controller 101 may output control information to the vehicle subsystems to cause the vehicle control subsystems to operate in the states as shown in FIG. 5, for example. In various embodiments, mobility traction control system 100 can be used, for example, for traction control of multi-wheeled vehicles such as, for example, but not limited to, a six-wheel Human Mobility Vehicle (HMV). However, the embodiments disclosed herein may be useful for a variety of different vehicle types.

According to various embodiments, reset mode 506 (e.g., emergency/reset button) can be used when payload changes occur. Moreover, reset mode 506 may also be initiated in response to a signal from air bag pressure monitoring system 110. Furthermore, a mode may be provided for a suspension air out state (not shown) in which mode controller 101 is configured to output an audible alarm via communication apparatus 103 if vehicle speed exceeds a predetermined threshold. Alternatively, mode controller 101 can be configured to actively limit vehicle speed remain at or below the predetermined threshold. Mode controller 101 can also output an audible alarm via communicator apparatus 103 in response to a steering input that is beyond a predetermined threshold. In various embodiments, modes can be provided for a suspension maximum height state.

In addition, various embodiments can comprise a side slope mode in which buttons are provided on keypad 202 that, when actuated, cause mode controller 101 to lower one side (e.g., the upslope side) of the vehicle to its lowest ride height setting and the other side of the vehicle (e.g., the downslope side) to its highest setting. In various embodiments, the side slope mode can provide additional side slope mobility or travel capability to permit operation for an additional amount of side slope than would be possible without the side slope mode such as, for example, but not limited to, an additional 9.9 degrees of side slope mobility or travel capability.

Furthermore, various embodiments can comprise a run flat mode or scenario in which mode controller 101 can be configured, in response to receiving an input via keypad 202, to lower the ride height or suspension on the three corners of the vehicle relative to the corner to which the flat tire is most nearly located, in order to reduce the weight and side loads that would otherwise be placed on the damaged tire. This mode can extend the operating range of the vehicle in a run flat situation. Further description is provided in commonly-assigned U.S. patent application Ser. No. 11/430,771, filed May 9, 2006, which is hereby incorporated by reference as if set forth fully herein.

Various embodiments can also include a tow mode 507, which can be used in conjunction with one of the other modes 502-506. For example, other modes can be active when the vehicle is being towed. However, in various embodiments, when tow mode 507 is active the front, center, and rear differentials can be set to the open state, overriding any mode's locked state specification.

In addition to the mode selection and vehicle subsystem state information shown in FIG. 5, mobility traction/ride control system 100 may comprise additional features used for vehicle ride control, including features useful for traction control. For example, in various embodiments, mode controller 101 can calculate a vehicle three-dimensional center of gravity and individual axle weights based on one or more subsystem's configuration in a particular mode or setting. In various embodiments, for example, the three-dimensional center of gravity and individual axle weights can be calculated using axle weights and axle ride heights associated with each axle for a particular mode. In various embodiments, these calculations can be included separately or in combinations. Moreover, mode controller 101 can output the calculated center of gravity and axle weights values to load master interface 109, which may send the values to CTIS 108, active damper control 114, and chassis management system 115 for further processing. In various embodiments, the calculated values may be stored in by any suitable means in vehicle mobility traction/ride control system 100. In various embodiments, keypad 202 may include a button for actuation of the center of gravity and axle weight calculation. For example, referring back to FIG. 4, a button labeled CT CG CALC may be designated as the button to initiate the determination of the center of gravity and axles' weights.

Figure 6:
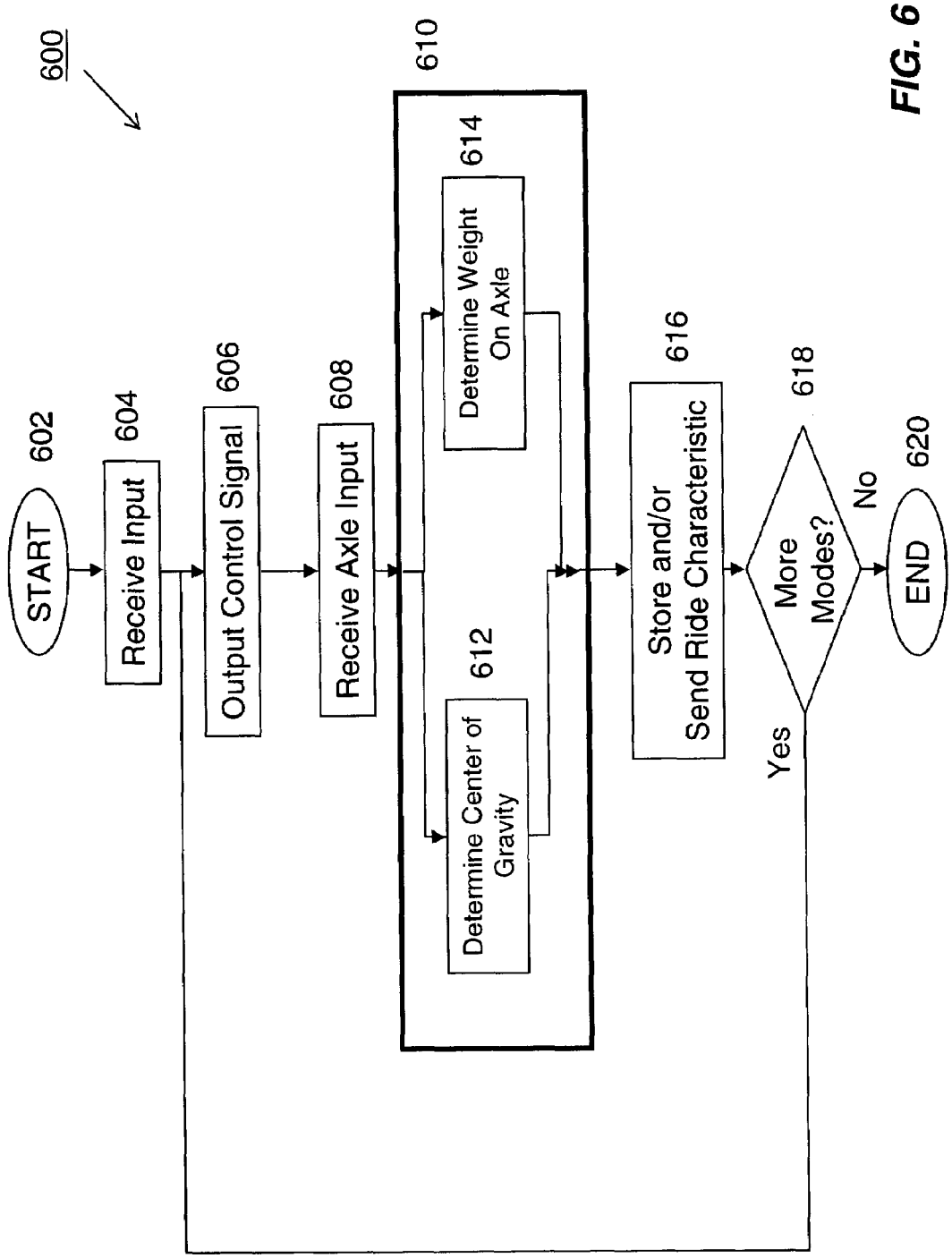
FIG. 6 is a flowchart of a ride control method according to various embodiments.

FIG. 6 shows flow chart representation of a method 600 for determining at least one vehicle mobility traction/ride characteristic. In various embodiments, the at least one vehicle mobility traction/ride characteristic can include a vehicle's three-dimensional center of gravity and an individual axle weight. In this embodiment, control begins at 602 and proceeds to 604 when an input is received to initiate a determination of the center of gravity and axle weight calculation. In various embodiments, system 100 may receive at input apparatus 102, a user input, either manually or remotely, to initiate the determination of the center of gravity and axle weight calculation. In various embodiments, a user may initiate the determination by selecting a button 204 from keypad 202. In response to the user input, input apparatus 102 can transfer a signal indicative of the user input to mode controller 101. Control may then proceed to 606.

At 606, a control signal can be output to a vehicle subsystem, such as a vehicle suspension system, based on one of the user-selectable vehicle traction modes. In various embodiments, mode controller 101 can output the control signal to a vehicle subsystem to configure the vehicle subsystem according to the selected user-selectable vehicle traction mode. Control may then proceed to 608.

At 608, a first signal indicative of a height of the chassis with respect to an axle, which can be, for example, an individual height above an axle or a combined height above multiple axles, when the vehicle is configured according to the selected user-selectable vehicle traction mode is received. At 608, a second signal indicative of a weight on an axle, such as, for example, a weight on an individual axle, when the vehicle is configured according to the selected user-selectable vehicle traction mode is also received. In various embodiments, mode controller 101 can receive the first and second signals from any appropriate source, including, but not limited to sensors appropriately located to determine the height and weight with respect to the axle(s). Control may then proceed to 610.

At 610, a determination is made of at least one of the ride characteristics, such as the vehicle's center of gravity and the weight on the axle(s). The determination can be made in any suitable manner, such as, but not limited to, performing a calculation, using a look-up table, or combinations thereof. In various embodiments, and as shown in FIG. 6, the method determines two ride characteristics, a vehicle three-dimensional center of gravity at 612 and a vehicle weight on axle at 614, in parallel. As discussed above, each of these determinations may be made by any suitable manner. In various other embodiments, however, the vehicle mobility traction/ride characteristics may be determined sequentially. In addition, in various other embodiments, the method may determine only one vehicle mobility/traction ride characteristic. In various embodiments, mode controller 101 can perform the determination. Control may then proceed to 616.

At 616, the determined mobility traction/ride characteristics can be transmitted and/or saved. In various embodiments, mobility traction/ride characteristics can be transmitted to load master interface 109 and/or saved in a memory apparatus (not shown). Memory apparatus may be any suitable memory apparatus, such as, but not limited to ROM, PROM, EEPROM, RAM, flash memory, etc., and may be located at any suitable position. Control may then proceed to 618.

At 618, the method 600 may repeat 606-616 for each remaining mode. In various embodiments, mode controller 101 determines, by any suitable means, whether to repeat 606-616. In various embodiments, if it is determined that 606-616 have been performed for each mode, control may proceed to 620, where the method 600 of determining ends.

Figure 7:
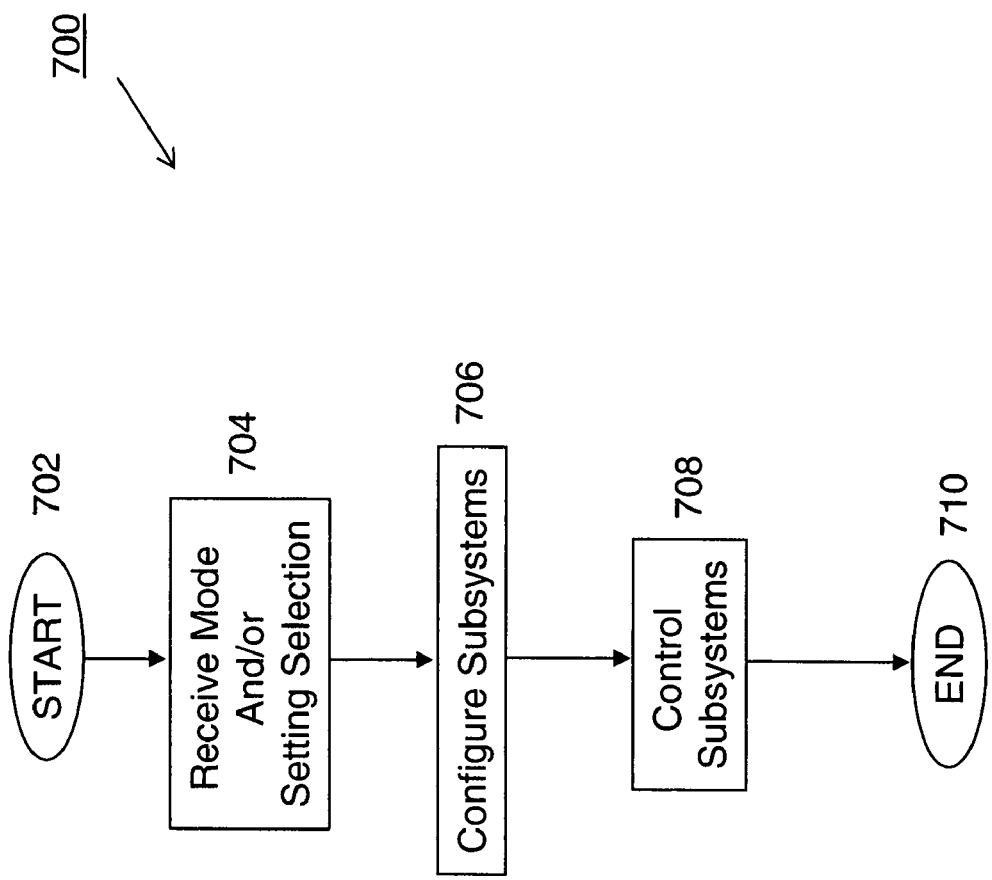
FIG. 7 is a flow chart of a traction control method according to various embodiments.

Turning to FIG. 7, this figure is a flow chart of a method 700 for controlling one or more vehicle subsystems. In various embodiments, the one or more vehicle subsystems may include CTIS 108, active damper control system 114, and chassis management system 115. As seen in FIG. 7, control may begin at 702 and proceed to 704, where an input is received to configure the vehicle according to a user-selectable mobility traction/ride mode. In various embodiments, system 100 may receive at input apparatus 102 a user input, either manually or remotely, to initiate the configuration of the vehicle according to the selected mode. In various embodiments, a user may initiate the configuration by selecting a button 204 from keypad 202. In response to the user input, input apparatus 102 can transfer a signal indicative of the user input to mode controller 101. Control may then proceed to 706.

At 706, vehicle subsystems are configured according to the mobility traction/ride mode or setting selected by the user. In various embodiments, mode controller 101 sends signals, including data and information, to one or more of the vehicle subsystems to configure the subsystems according to the selected mode and/or setting. In addition, in various embodiments, when configuring vehicle subsystems according to the selected mode and/or setting, previously determined mobility traction/ride characteristics may be taken into consideration in the configuration. Control may then proceed to 708.

At 708, the vehicle, including its subsystems, is controlled according to the selected mobility traction/ride mode and/or setting, which may have, in various embodiments, taken into account one or more previously determined vehicle characteristics. Control may then proceed to 710 where the method terminates.

Figure 8:
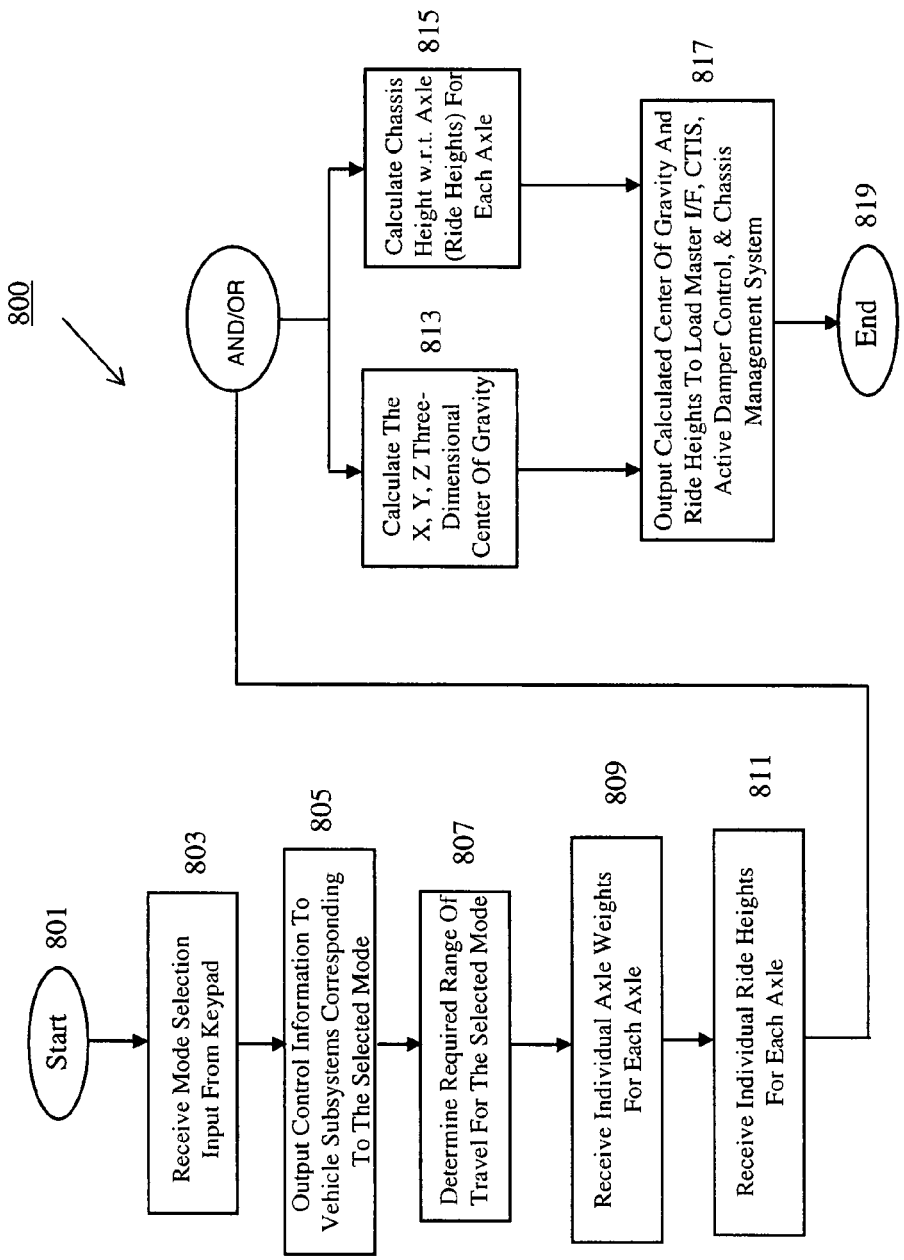
FIG. 8 is a flow chart of a traction control method according to various embodiments.

FIG. 8 shows a flow chart of a mobility traction/ride control method 800 according to various embodiments. As shown in FIG. 8, mobility traction/ride control method 800 can commence at 801. The method can proceed to 803, at which mode controller 101 receives a mobility traction/ride mode and/or setting selection input from, for example, keypad 202. Control can then proceed to 805, at which mode controller 101 outputs control information to the vehicle subsystems for the selected mobility traction/ride mode and/or selection, as shown, for example, in FIG. 5. Control may then proceed to 807, at which the mode controller 101 determines a ride height range of travel for one of a plurality of operating modes. Control can then proceed to 809, at which mode controller 101 receives weight on axle information for each of a plurality of axles. The weight on axle information can be received from load master interface 109. Control can then proceed to 811, at which mode controller 101 receives chassis height with respect to axle (i.e., "ride height") information for each of the plurality of axles. The ride height information can be received from the load master interface 109. In various embodiments, the number of axles can be three. Control can then proceed to 813 and 815, at which mode controller 101 calculates a three-dimensional coordinate location of a vehicle center of gravity based on the weight on axle information and the ride heights for each axle, respectively. Control can then proceed to 817, at which mode controller 101 can output the calculated center of gravity and ride heights to load master interface 109, CTIS 108, active damper control 114, and chassis management system 115. Control can then proceed to 819, at which the method 800 ends.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be, or are apparent, to those of ordinary skill in the applicable arts. Accordingly, Applicant intends to embrace all such alternatives, modifications, equivalents, and variations that are within the spirit and scope of this invention.

What is claimed is:

1. A method for determining vehicle ride characteristics corresponding to user-selectable vehicle traction control modes, comprising the steps of:

receiving a user input to initiate a determination of at least one vehicle ride characteristic;

outputting a control signal to configure a vehicle subsystem according to one of said user-selectable vehicle traction control modes;

receiving a first input indicative of a chassis height with respect to at least one axle when said vehicle subsystem is configured according to said one user-selectable vehicle traction control mode, and a second input indicative of a weight on at least one axle when said vehicle subsystem is configured according to said one user-selectable vehicle traction control mode; and determining said at least one vehicle ride characteristic based on said first and second inputs.

2. A method for determining vehicle ride characteristics corresponding to user-selectable vehicle traction modes according to claim 1, further comprising the steps of repeating said outputting, said receiving, and said determining for each remaining user-selectable vehicle traction control mode.

3. A method for determining vehicle ride characteristics corresponding to user-selectable vehicle traction control modes according to claim 1, wherein said receiving occurs in response to a user selection entered using at least a first keypad.

4. A method for determining vehicle ride characteristics corresponding to user-selectable vehicle traction control modes according to claim 1, wherein said at least one vehicle ride characteristic is one of a three-dimensional center of gravity of said vehicle and said weight on at least one axle.

5. A method for determining vehicle ride characteristics corresponding to user-selectable vehicle traction control modes according to claim 4, further comprising:
controlling said vehicle in one of said user-selectable vehicle traction modes using a controller, further comprising the steps of:
controlling at least one vehicle ride characteristic for a run flat operation mode; and
calculating the three-dimensional vehicle center of gravity;
selecting a vehicle traction control mode in the controller using at least a first input keypad;
communicating vehicle ride information to the user; and
controlling the operation of at least one vehicle ride characteristic with the controller.

6. A method for determining vehicle ride characteristics corresponding to user-selectable vehicle traction control modes according to claim 1, wherein said at least one vehicle ride characteristic is used to control one or more vehicle subsystems selected from the group consisting of: a central tire inflation system, an active damper system, and a chassis management system.

7. A system for determining vehicle ride characteristics corresponding to user-selectable vehicle traction modes, comprising:
input means for receiving a user input to initiate a determination of at least one vehicle ride characteristic;
means for outputting a control signal to configure a vehicle subsystem according to one of said user-selectable vehicle traction control modes;
means for receiving a first input indicative of a chassis height with respect to at least one axle when said vehicle subsystem is configured according to said one user-selectable vehicle traction control mode, and a second input indicative of a weight on at least one axle when said vehicle subsystem is configured according to said one user-selectable vehicle traction control mode; and
means for determining said at least one vehicle ride characteristic based on said first and second inputs;
wherein said user-selectable vehicle traction control modes includes a run flat control mode, and wherein said means for outputting a control signal is configured, in response to receiving a corresponding run flat user input via said input means, to lower a ride height on first, second and third corners of the vehicle with respect to a fourth corner that is closest to a flat tire.

8. A system for determining vehicle ride characteristics corresponding to user-selectable vehicle traction modes according to claim 7, further comprising means for repeating said outputting, said receiving, and said determining for each remaining user-selectable vehicle traction control mode.

9. A system for determining vehicle ride characteristics corresponding to user-selectable vehicle traction control modes according to claim 7, wherein said at least one vehicle ride characteristic is one of a three-dimensional center of gravity of said vehicle and said weight on at least one axle.

10. A system for determining vehicle ride characteristics corresponding to user-selectable vehicle traction control modes according to claim 7, wherein said at least one vehicle ride characteristic is used to control one or more vehicle subsystems selected from the group consisting of: a central tire inflation system, an active damper system, and a chassis management system.

11. A system for modifying vehicle ride characteristics based on user input, comprising:
a vehicle mode controller;
a user input apparatus coupled to the vehicle mode controller, said user input apparatus including at least a first keypad; and
at least one vehicle subsystem controlled by the vehicle mode controller,
wherein said first keypad receives a selection of a user-selectable vehicle traction/ride control mode,
said vehicle mode controller outputs control information to said at least one vehicle subsystem based on said selected vehicle traction/ride control mode,
said vehicle mode controller calculates a three-dimensional center of gravity of a vehicle based on a weight on at least one axle and a chassis height with respect to at least one axle, and
said vehicle mode controller outputs the three-dimensional center of gravity, and
said vehicle mode controller controls said vehicle subsystem based on said three-dimensional center of gravity.

12. The system of claim 1, wherein the vehicle mode controller and the at least one vehicle subsystem are configured to provide vehicle traction control.

13. The system of claim 12, wherein the vehicle subsystems comprise:
a ride height adjustment system;
a differential control system;
a tire inflation system;
an anti-lock braking system; and
a stability control system.

14. The system of claim 13, wherein the vehicle mode controller provides a run flat vehicle ride control mode.

15. The system of claim 11, wherein the vehicle mode controller is configured to further perform:
a chassis height above axle calculation; and
a weight on axle calculation.

* * * * *

UNITED STATES PATENT AND TRADEMARK OFFICE
CERTIFICATE OF CORRECTION

| | |
|---|---|
| PATENT NO. | : 7,577,508 B2 |
| APPLICATION NO. | : 11/798018 |
| DATED | : August 18, 2009 |
| INVENTOR(S) | : Patrick J. Fitzgibbons |

It is certified that error appears in the above-identified patent and that said Letters Patent is hereby corrected as shown below:

Column 10 – Line 42, replace "Claim 1" with "claim 11".

Signed and Sealed this

Twentieth Day of October, 2009

David J. Kappos
*Director of the United States Patent and Trademark Office*